(12) United States Patent
Sampaio et al.

(10) Patent No.: US 11,038,305 B1
(45) Date of Patent: Jun. 15, 2021

(54) ELECTRICAL CORD CONNECTOR FOR SECURING TWO ELECTRICAL CORDS CONNECTED TO ONE ANOTHER

(71) Applicants: Hesrom Moreira Sampaio, Myakka, FL (US); Brent Gregory Duholke, Ruskin, FL (US)

(72) Inventors: Hesrom Moreira Sampaio, Myakka, FL (US); Brent Gregory Duholke, Ruskin, FL (US)

( * ) Notice: Subject to any disclaimer, the term of this patent is extended or adjusted under 35 U.S.C. 154(b) by 0 days.

(21) Appl. No.: 16/812,057

(22) Filed: Mar. 6, 2020

Related U.S. Application Data

(60) Provisional application No. 62/814,447, filed on Mar. 6, 2019.

(51) Int. Cl.
*F16B 2/02* (2006.01)
*H01R 13/639* (2006.01)
*H01R 13/627* (2006.01)

(52) U.S. Cl.
CPC ........... *H01R 13/6392* (2013.01); *F16B 2/02* (2013.01); *H01R 13/627* (2013.01)

(58) Field of Classification Search
CPC .............................. H01R 13/6392; F16B 2/02
See application file for complete search history.

(56) References Cited

U.S. PATENT DOCUMENTS

| | | | |
|---|---|---|---|
| 2,406,567 A * | 8/1946 | Schueneman | H01R 13/6392 439/369 |
| 2,903,669 A * | 9/1959 | Gilman | H01R 13/6392 439/369 |
| 3,030,601 A | 4/1962 | Krebs | |
| 3,383,639 A * | 5/1968 | Anderson | H01R 13/6392 439/369 |
| 3,475,716 A | 10/1969 | Laig | |
| 3,609,638 A | 9/1971 | Darrey | |
| 4,221,449 A | 9/1980 | Shugart, Jr. | |
| 4,440,465 A * | 4/1984 | Elliott | H01R 13/6392 24/326 |
| 4,514,026 A | 4/1985 | Herbert | |
| 4,643,505 A | 2/1987 | House et al. | |
| 4,690,476 A | 9/1987 | Morgenrath | |

(Continued)

FOREIGN PATENT DOCUMENTS

FR 2605810 A1 * 4/1988 ......... H01R 13/6392

*Primary Examiner* — Tho D Ta
(74) *Attorney, Agent, or Firm* — John Rizvi; John Rizvi, P.A.—The Patent Professor®

(57) ABSTRACT

An electrical cord connector configured to secure a first electrical cord in electrical connection with a second electrical cord is provided including a first connector clamp configured to engage and secure the first electrical cord adjacent to a cord plug on the first electrical cord. A second connector clamp may be configured to engage and secure the second electrical cord adjacent to a cord socket on the second electrical cord. Each of the first connector clamp and the second connector clamp may include a clamp interior having a width or diameter less than a width or diameter of a cord plug on the first electrical cord and a cord socket on the second electrical cord. A connecting member may connect the second connector clamp to the first connector clamp with the first connector clamp engaging the cord plug on the first electrical cord and the second connector clamp engaging the cord socket on the second electrical cord.

20 Claims, 12 Drawing Sheets

(56) References Cited

U.S. PATENT DOCUMENTS

| | | | |
|---|---|---|---|
| 4,957,450 A * | 9/1990 | Pioszak | H01R 13/6392 |
| | | | 439/369 |
| 5,104,335 A * | 4/1992 | Conley | H01R 13/6392 |
| | | | 439/369 |
| 5,129,839 A | 7/1992 | VanSkiver | |
| 5,179,044 A | 1/1993 | Muromachi et al. | |
| 5,217,387 A | 6/1993 | Hull et al. | |
| 5,573,420 A | 11/1996 | Grosswendt | |
| 5,755,588 A | 5/1998 | Sweatman et al. | |
| 5,782,648 A * | 7/1998 | Peterson | H01R 13/6392 |
| | | | 24/16 PB |
| 6,033,251 A | 3/2000 | Cook | |
| 6,056,580 A | 5/2000 | Cross et al. | |
| 6,957,977 B1 | 10/2005 | Miller | |
| 6,979,221 B1 | 12/2005 | Hunter | |
| 7,407,405 B1 * | 8/2008 | Slenczka | H01R 13/6392 |
| | | | 439/369 |
| 7,544,082 B1 | 6/2009 | Halvorsen | |
| 8,082,665 B2 | 12/2011 | Zimmerman et al. | |
| 9,276,359 B2 * | 3/2016 | Brown | H01R 13/6392 |
| 9,425,553 B2 | 8/2016 | Brown | |
| D812,015 S | 3/2018 | Ryder | |
| 2016/0111820 A1 * | 4/2016 | Brown | H01R 13/6392 |
| | | | 439/369 |
| 2018/0316137 A1 * | 11/2018 | Bozikis | H01R 13/639 |

\* cited by examiner

ELECTRICAL CORD CONNECTOR FOR SECURING TWO ELECTRICAL CORDS CONNECTED TO ONE ANOTHER

CROSS-REFERENCE TO RELATED APPLICATIONS

This application claims the benefit of U.S. Provisional Patent Application No. 62/814,447, filed on Mar. 6, 2019, which is incorporated by reference herein in its entirety.

FIELD OF THE INVENTION

The present invention relates generally to electrical cords, and more particularly, to an electrical cord connector which is configured to secure a first electrical cord in electrical connection with a second electrical cord.

BACKGROUND OF THE INVENTION

Appliances such as power tools and household items such as vacuum cleaners are typically electric-powered. Accordingly, the appliances may include an elongated, flexible power cord which is terminated by a plug having plug prongs. The plug prongs on the power cord are inserted into a standard household or other electrical outlet to supply electrical power to the appliance.

Frequently, electrical outlets are not in convenient or accessible locations which are desired for operation of the appliances. Therefore, electrical extension cords are commonly used to connect an electrical appliance with an electrical outlet. A typical conventional electrical extension cord may include bundled wiring coated with an electrically insulating cover. A pronged electrical plug and an electrical socket may terminate opposite ends of the wiring. Thus, the electrical plug on the extension cord may be inserted in the electrical outlet and the plug on the power cord of the appliance may be inserted in the electrical socket of the extension cord to electrically connect the appliance with the electrical outlet.

Under some circumstances, such as when the electrical outlet is located at a particularly large distance from the location at which the appliance is to be used, it may be common practice to connect a pair of extension cords to each other in order to extend the reach between the outlet and the appliance. A common drawback to this approach, however, is that the extension cords may become accidentally or inadvertently detached, such as in the event that the appliance is pulled beyond the reach of the combined extension cords. Attempts to solve this problem may include tying the extension cords together. However, tying the cords together may cause the cord ends to become frayed, potentially creating an electrical hazard.

Accordingly, there is an established need for a solution for securing a first electrical cord in electrical connection with a second electrical cord, which is capable of retaining the electrical cords connected to one another without damaging the cords.

SUMMARY OF THE INVENTION

The present invention is directed to an electrical cord connector which is configured to securely connect a first electrical cord to a second electrical cord in a safe and stable way. The electrical cord connector may be used in a wide variety of applications such as, but not limited to, construction applications, home or business electrical installations or connections, and medical equipment installations (such as to prevent disconnecting of prominent medical equipment). The electrical cord connector may include a first connector clamp and a second connector clamp. Each connector clamp may be configurable in an open clamp position and a closed clamp position, with a first clamp portion and a second clamp portion hinged to the first clamp portion. A clamp interior may be formed by the first clamp portion and the second clamp portion in the closed clamp position. The clamp interior may have a width or diameter which is less than a width or diameter of a cord plug and a cord socket on the first electrical cord and the second electrical cord, respectively. Each of the first clamp portion and the second clamp portion may be configured to engage the corresponding first electrical cord and second electrical cord on opposite sides of the connection between a cord plug on the first electrical cord a cord socket on the second electrical cord. A connecting member may connect the first connector clamp and the second connector clamp in a spaced-apart relationship with one another. The connecting member may be selectively adjustable in length and may include a first elongated body on the first connector clamp and a second elongated body on the second connector clamp. The first elongated body may engage the second elongated body at overlapping portions of each to secure the second connector clamp at a selected distance with respect to the first connector clamp. Accordingly, the electrical cord connector may accommodate electrical cords having various cord plug and cord socket lengths.

In a first implementation, an electrical cord connector configured to secure a first electrical cord in electrical connection with a second electrical cord comprises a first connector clamp, a second connector clamp, and a connecting member configured to connect the second connector clamp to the first connector clamp in a spaced-apart relationship with one another. The first and second connector clamps can adopt a respective closed clamp position to respectively engage the first electrical cord and the second electrical cord. The first connector clamp in the closed clamp position defines a clamp interior having a width less than a width of a cord plug on the first electrical cord. In turn, the second connector clamp in the closed clamp position defines a clamp interior having a width less than a width of a cord socket on the second electrical cord. The electrical cord connector is configured to adopt an assembled configuration in which the first and second connector clamps are arranged in the respective closed clamp positions and are arranged at a first distance from each other, with the first connector clamp engaging the first electrical cord and abutting against the cord plug and the second connector clamp engaging the second electrical cord and abutting against the cord socket. In this assembled configuration, the connecting member prevents separation of the first connector clamp and the second connector clamp from one another.

In a second aspect, the electrical cord connector may be further configured to adopt a partially assembled configuration, in which the first and second connector clamps may be arranged in the respective closed clamp positions, with the first and second connector clamps engaging the first and second electrical cords, respectively, and with the first and second connector clamps arranged at a second distance from one another greater than the first distance. Also in this partially assembled configuration, the connecting member may prevent separation of the first connector clamp and the second connector clamp from one another and may allow bringing the first and second connector clamps closer to one another.

In another aspect, the connecting member may be length-adjustable.

In another aspect, the connecting member may include a first elongated body on the first connector clamp and a second elongated body on the second connector clamp. The first elongated body may be configured to secure to the second elongated body at adjustable overlapping positions of the first and second elongated bodies relative to one another.

In another aspect, the first elongated body may be integrally-formed into a single-piece unit with the first connector clamp, and the second elongated body may be integrally-formed into a single-piece unit with the second connector clamp.

In another aspect, the first and second elongated bodies may be securable at adjustable overlapping positions by longitudinally adjusting engagement between at least one protrusion comprised in one of the first and second elongated bodies and a plurality of longitudinally-spaced-apart cavities comprised in the other one of the first and second elongated bodies.

In another aspect, the first and second elongated bodies may be securable at adjustable overlapping positions by longitudinally adjusting engagement between at least one cavity comprised in one of the first and second elongated bodies and a plurality of longitudinally-spaced-apart protrusions comprised in the other one of the first and second elongated bodies.

In another aspect, one of the first and second elongated bodies may include multiple longitudinally-spaced-apart cavities and the other one of the first and second elongated bodies may include multiple longitudinally-spaced-apart protrusions. The first and second elongated bodies may be securable at different overlapping positions by adjusting which of the cavities and protrusions engage with each other.

In another aspect, the first and second elongated bodies may include a respective strip.

In another aspect, one of the first and second elongated bodies may include a retaining sleeve configured to receive the other one of the first and second elongated bodies therethrough.

In another aspect, the retaining sleeve may include a first sleeve portion and a second sleeve portion. The first and second sleeve portions may be pivotable relative to one another such that the retaining sleeve can selectively pivot between an open sleeve position and a closed sleeve position. In the open sleeve position, the retaining sleeve may allow to insert and remove said other one of the first and second elongated bodies from the retaining sleeve. In the closed sleeve position, the retaining sleeve may embrace said other one of the first and second elongated bodies.

In another aspect, the retaining sleeve may include a clip fastener configured to secure the retaining sleeve in the closed sleeve position.

In another aspect, the clip fastener may be configured to releasably secure the retaining sleeve in the closed sleeve position.

In another aspect, the retaining sleeve of said one of the first and second elongated bodies may include a plurality of longitudinally-spaced-apart cavities, and the other one of the first and second elongated bodies may include multiple longitudinally-spaced-apart protrusions. The first and second elongated bodies may be securable at different overlapping positions by adjusting which of the cavities and protrusions engage with each other.

In another aspect, the retaining sleeve of said one of the first and second elongated bodies may include a plurality of longitudinally-spaced-apart protrusions, and the other one of the first and second elongated bodies may include multiple longitudinally-spaced-apart cavities. The first and second elongated bodies may be securable at different overlapping positions by adjusting which of the cavities and protrusions engage with each other.

In another aspect, the first connector clamp may be shaped and sized the same as the second connector clamp.

In another aspect, at least one of the first and second connector clamps may be securable in the closed clamp position by a clip fastener.

In another aspect, the clip fastener may be configured to releasably secure said at least one of the first and second connector clamps in the closed sleeve position.

These and other objects, features, and advantages of the present invention will become more readily apparent from the attached drawings and the detailed description of the preferred embodiments, which follow.

BRIEF DESCRIPTION OF THE DRAWINGS

The illustrative embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward an electrical cord connector which is configured to secure a first electrical cord in electrical connection with a second electrical cord.

Figure 1:
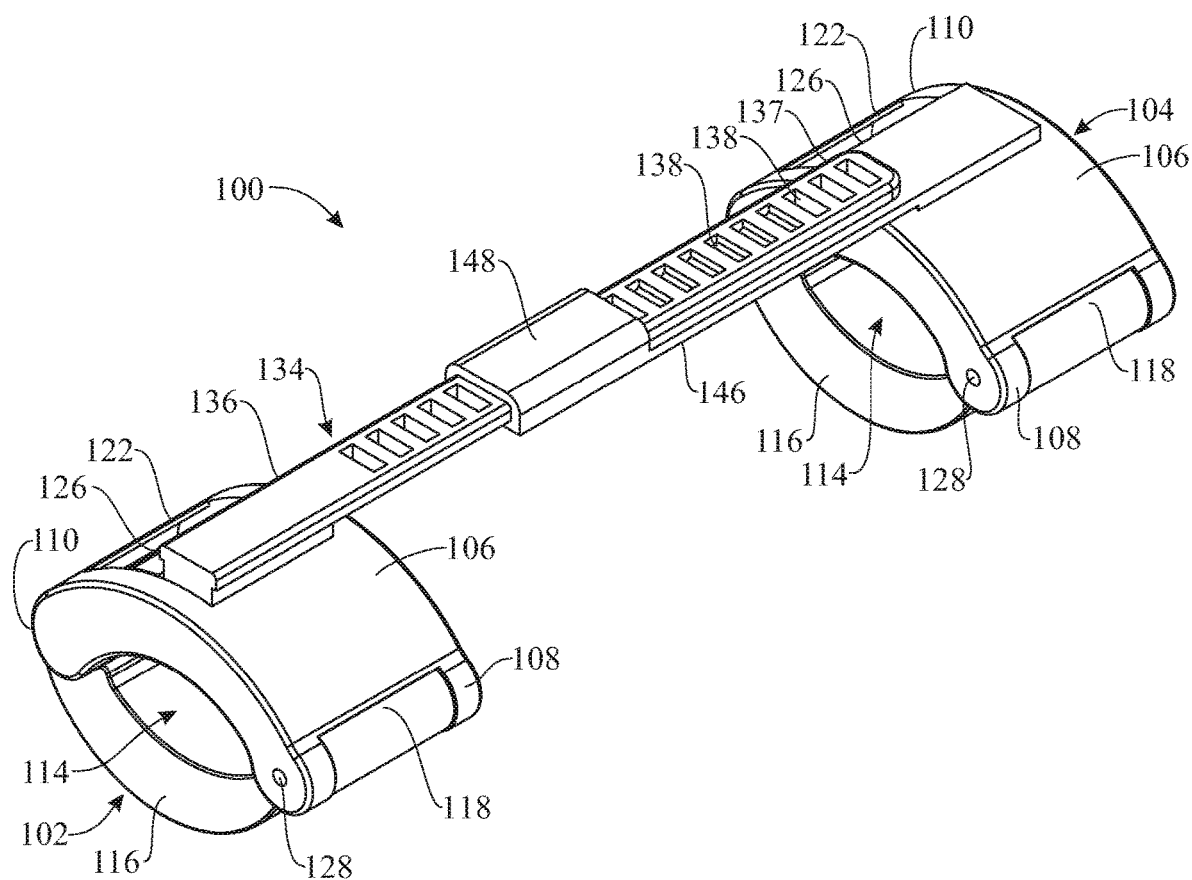
FIG. 1 presents a front perspective view showing an illustrative embodiment of the electrical cord connector of the present invention.
Figure 2:
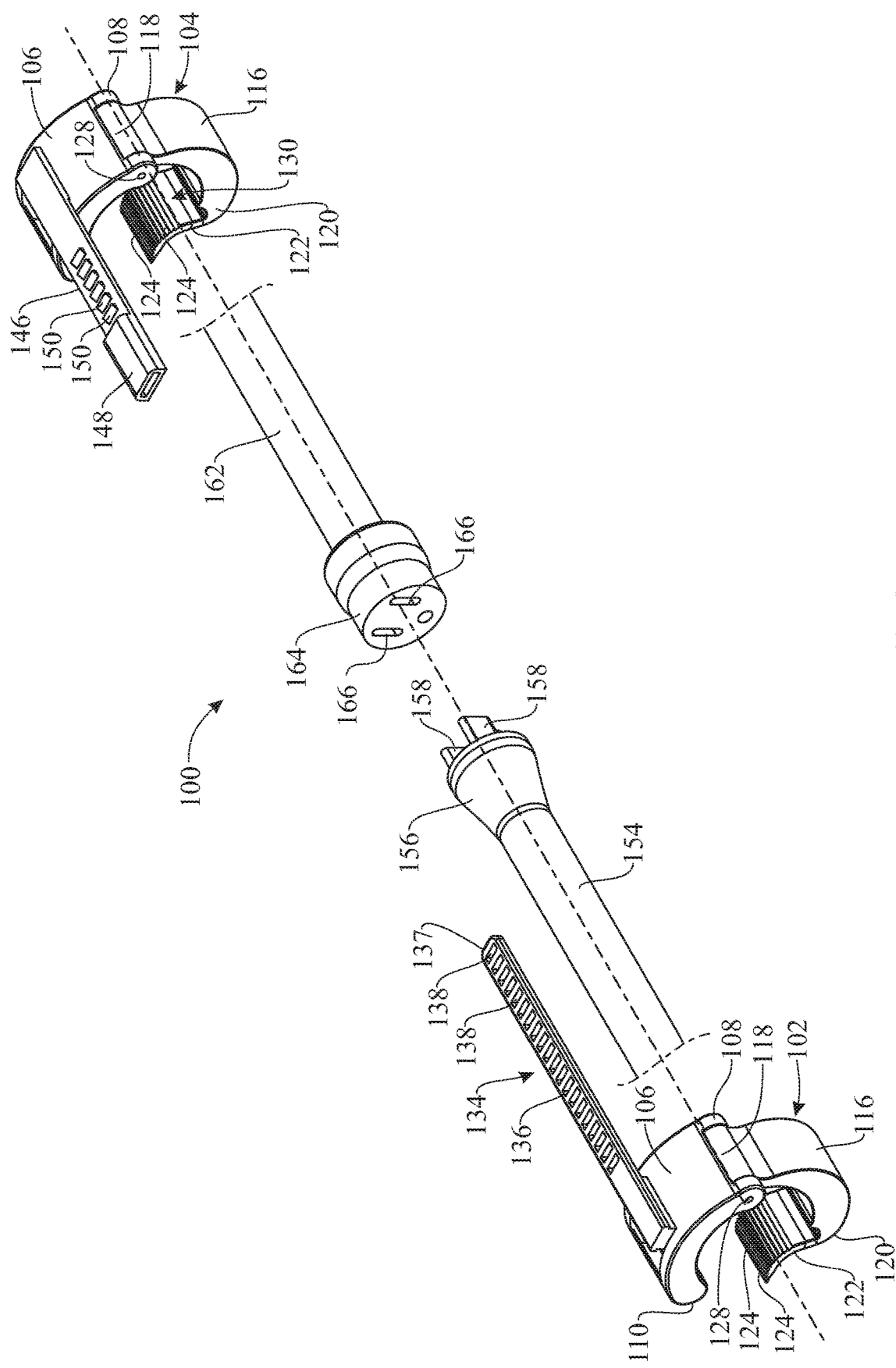
FIG. 2 presents an exploded front perspective view of the illustrative embodiment of the electrical cord connector of the present invention.

The illustrations of FIGS. 1-8 show an illustrative embodiment of the electrical cord connector, generally indicated by reference numeral 100. Referring initially to FIGS. 1 and 2, in typical application, and as will be hereinafter described, the electrical cord connector 100 may be suitably configured to secure an electrical connection between a first electrical cord 154 and a second electrical cord 162. In the non-limiting example shown in the drawings, each of the first electrical cord 154 and the second electrical cord 162 may be conventional in design and may have a cord plug 156 having plug prongs 158 at one end and a cord socket 164 having prong holes or slots 166 at the other end (it must be noted that the shape and number of prongs and holes/slots 166 may vary in dependence of the country, region, application, etc.). The first electrical cord 154 and/or second electrical cord 162 can be a permanent cord that is non-disconnectably attached to an electric-powered appliance or apparatus, or an extension cord that is disconnectably attachable to an electric-powered appliance or apparatus, electrical cord or outlet to provide an increase cord length; for example, the first electrical cord 154 may be electrically connected to an electrical appliance (not illustrated), whereas the second electrical cord 162 may be connected to an electrical outlet (not illustrated). The cord plug 156 on the first electrical cord 154 may be connected to the cord socket 164 on the second electrical cord 162 to establish electrical connection between the first electrical cord 154 and the second electrical cord 162.

As shown in FIG. 1, the electrical cord connector 100 may include a first connector clamp 102 and a second connector clamp 104. A connecting member 134 may connect the second connector clamp 104 to the first connector clamp 102. Each of the first connector clamp 102 and the second connector clamp 104 may have a clamshell design with a first clamp portion 106 and a second clamp portion 116 pivotably hinged to one another. Accordingly, each of the first connector clamp 102 and the second connector clamp 104 may be configurable between a closed clamp position, as illustrated in FIG. 1, and an open clamp position, as illustrated in FIG. 2. In the closed clamp position, a clamp interior 114 may be formed or defined between the first clamp portion 106 and the second clamp portion 116. The clamp interior 114 may have a width or diameter which is less than the width or diameter of the cord plug 156 on the first electrical cord 154 and the cord socket 164 on the second electrical cord 162 for purposes which will be hereinafter described.

Figure 6:
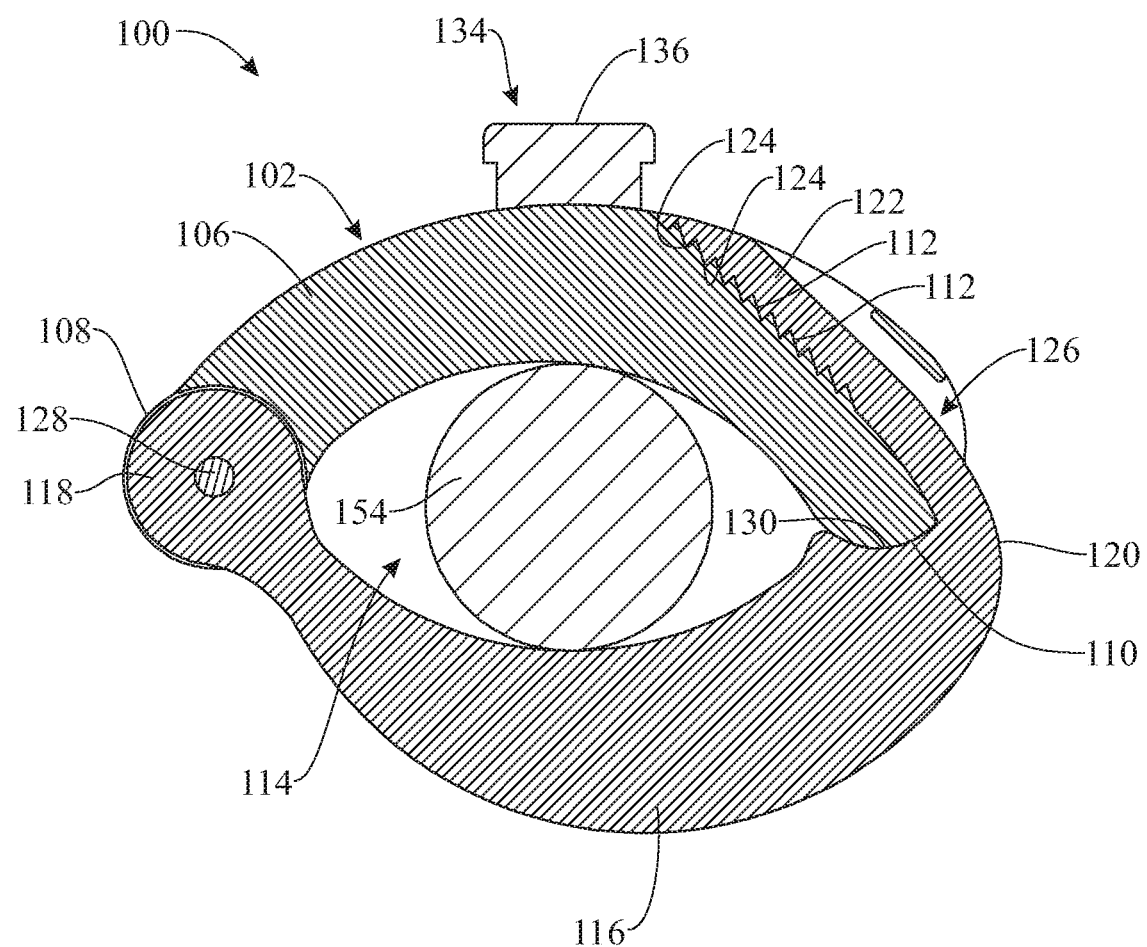
FIG. 6 presents a cross-sectional view of a typical first connector clamp of the electrical cord connector secured in place on the first electrical cord.

The first clamp portion 106 and the second clamp portion 116 of the first and second connector clamps 102 and 104 may each have a generally elongated, curved shape. The first clamp portion 106 may have a hinged end 108 and a free end 110. The second clamp portion 116 may have a hinged end 118 and a free end 120. Accordingly, as illustrated in FIG. 6, the hinged end 118 of the second clamp portion 116 may be hinged to the hinged end 108 of the first clamp portion 106 such as via a hinge pin 128, for example and without limitation. In some embodiments, a concave clamp cavity 130 may be provided in the free end 120 of the second clamp portion 116. The free end 110 of the first clamp portion 106 may have a convex shape such that the free end 110 of the first clamp portion 106 fits into the clamp cavity 130 of the second clamp portion 116 when the first connector clamp 102 and second connector clamp 104 are in the closed clamp position, as further illustrated in FIG. 6.

In some embodiments, a clamp flange 122 may extend from the free end 120 of the second clamp portion 116. As shown in FIGS. 2 and 6, multiple flange teeth 124 may extend from the clamp flange 122. In turn, as shown in FIG. 6, flange teeth cavities 112 may be provided in the first clamp portion 106 adjacent to the free end 110. Accordingly, the flange teeth 124 on the clamp flange 122 of the second clamp portion 116 may be inserted into the respective flange teeth cavities 112 in the first clamp portion 106 to secure the second clamp portion 116 in the closed clamp position on the first clamp portion 106. In some embodiments, a finger access or opening 126 (FIG. 4) may be provided in the first clamp portion 106, facing the clamp flange 122, to facilitate ease in facilitating engagement and disengagement of the clamp flange 122 with respect to the first clamp portion 106.

Figure 3:
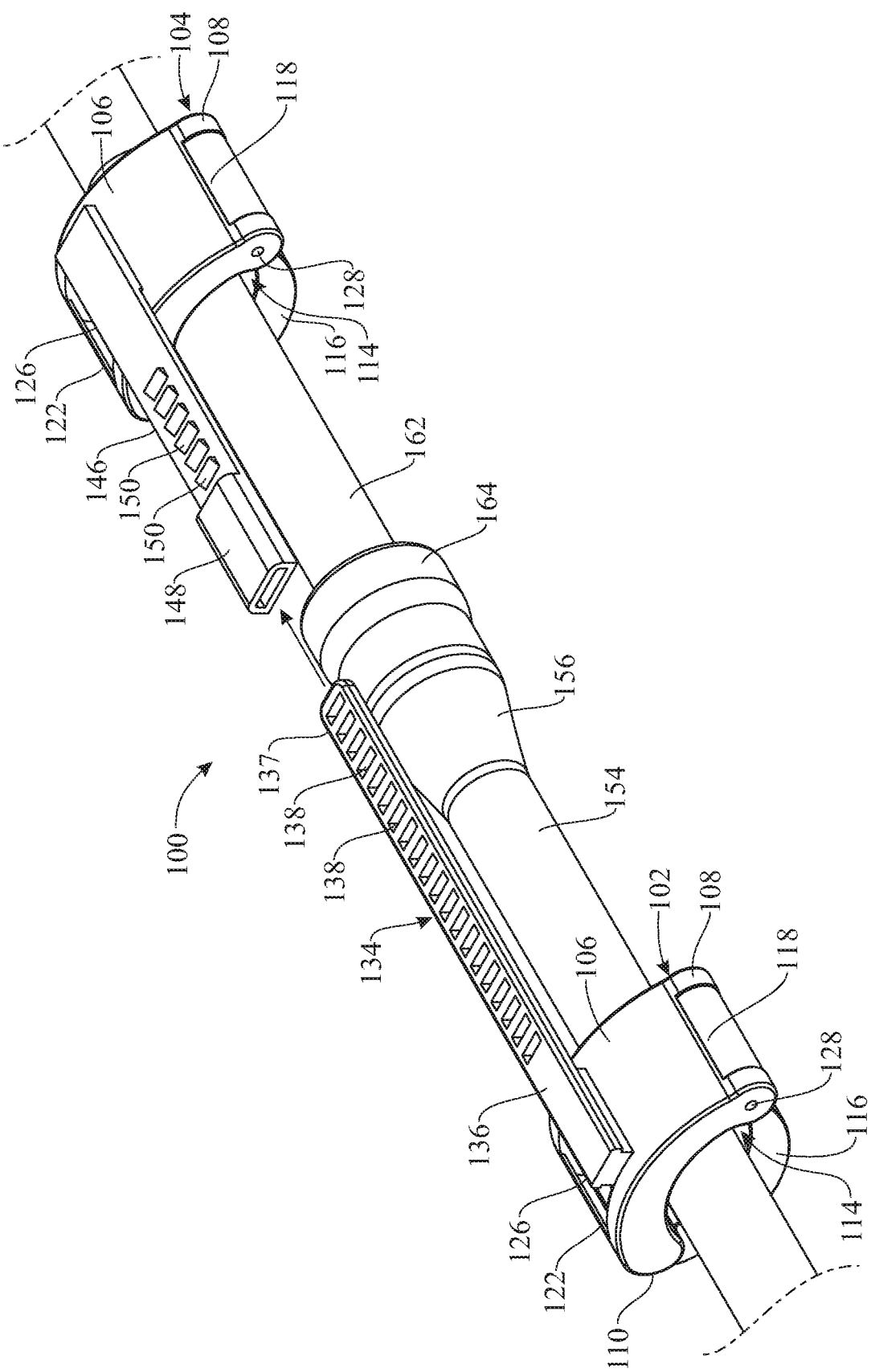
FIG. 3 presents a front perspective view of the illustrative embodiment of the electrical cord connector of the present invention, with the first connector clamp on a first electrical cord and the second connector clamp on a second electrical cord, more particularly illustrating typical insertion of the first elongated body into the second elongated body of the connecting member in typical application of the electrical cord connector.
Figure 4:
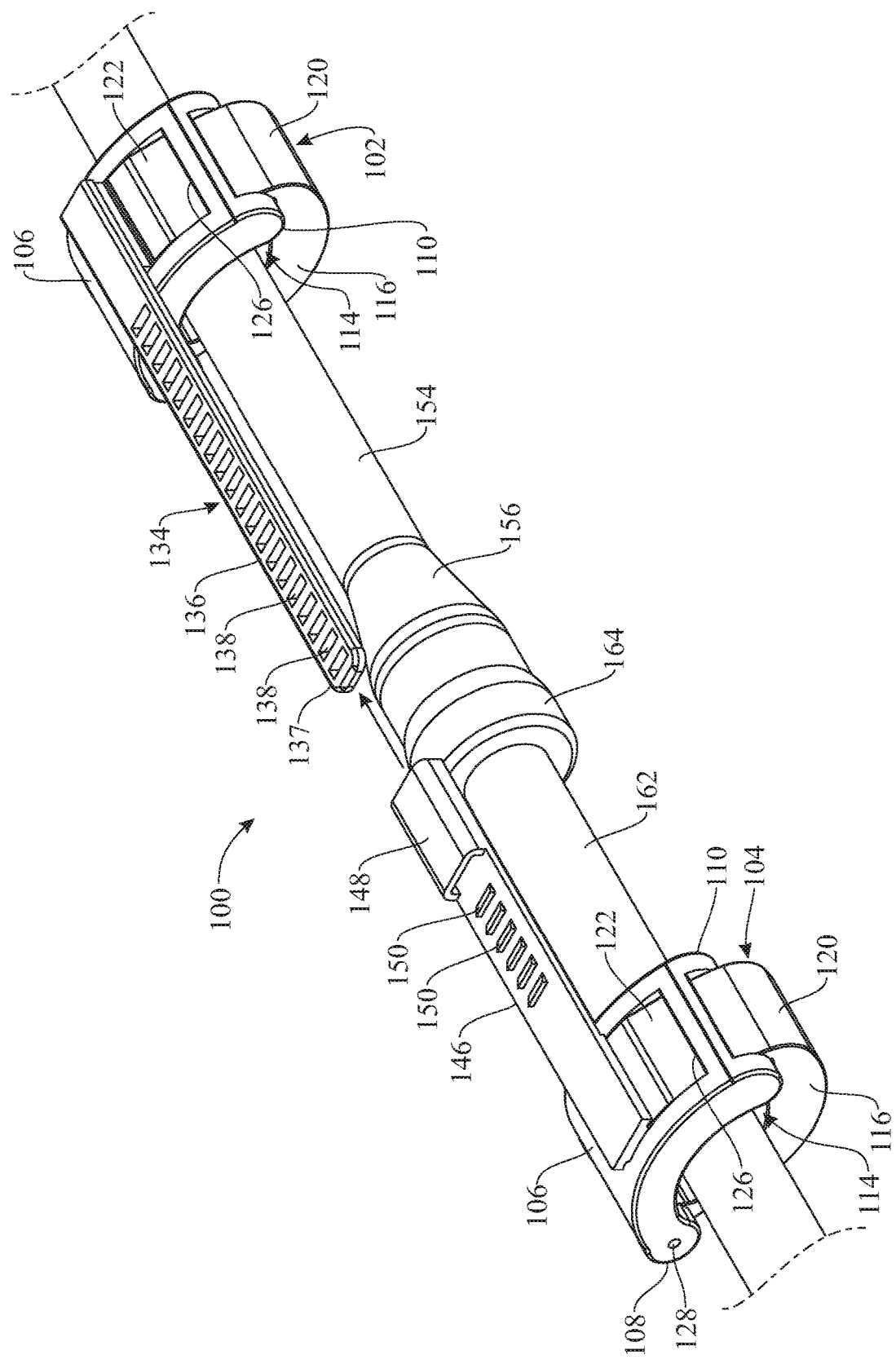
FIG. 4 presents a rear perspective view of the illustrative embodiment of the electrical cord connector of the present invention, with the first connector clamp on the first electrical cord and the second connector clamp on the second electrical cord, more particularly illustrating typical insertion of the first elongated body into the second elongated body of the connecting member in typical application of the electrical cord connector.

As illustrated in FIGS. 2-4, in some embodiments, the connecting member 134 may include a first elongated body 136 extending from the first connector clamp 102, and a second elongated body 146 extending from the second connector clamp 104. For instance, in the present embodiment, the first and second elongated bodies 136 and 146 extend from the first clamp portion 106 of the first and second connector clamp 102 and 104, respectively. In some embodiments, such as the present embodiment, the first and second elongated bodies 136 and 146 may be formed as strips. The first and second elongated bodies 136 and 146 are configured to connect or attach to one another. For instance, in the present embodiment, the second elongated body 146 may include a retaining sleeve 148 suitably sized and configured to receive and accommodate the first elongated body 136. In some embodiments, the first elongated body 136 may detachably engage the second elongated body 146. Alternatively or additionally, the first elongated body 136 may adjustably engage the second elongated body 146.

Figure 8:
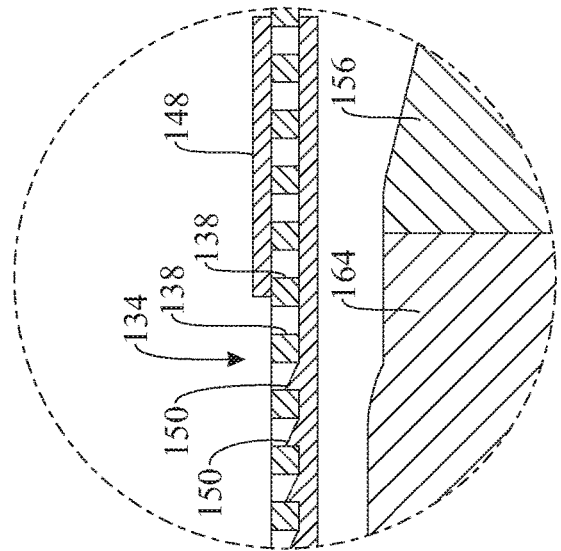
FIG. 8 is an enlarged sectional view of the connecting member, taken at the section circle in FIG. 7.
Figure 7:
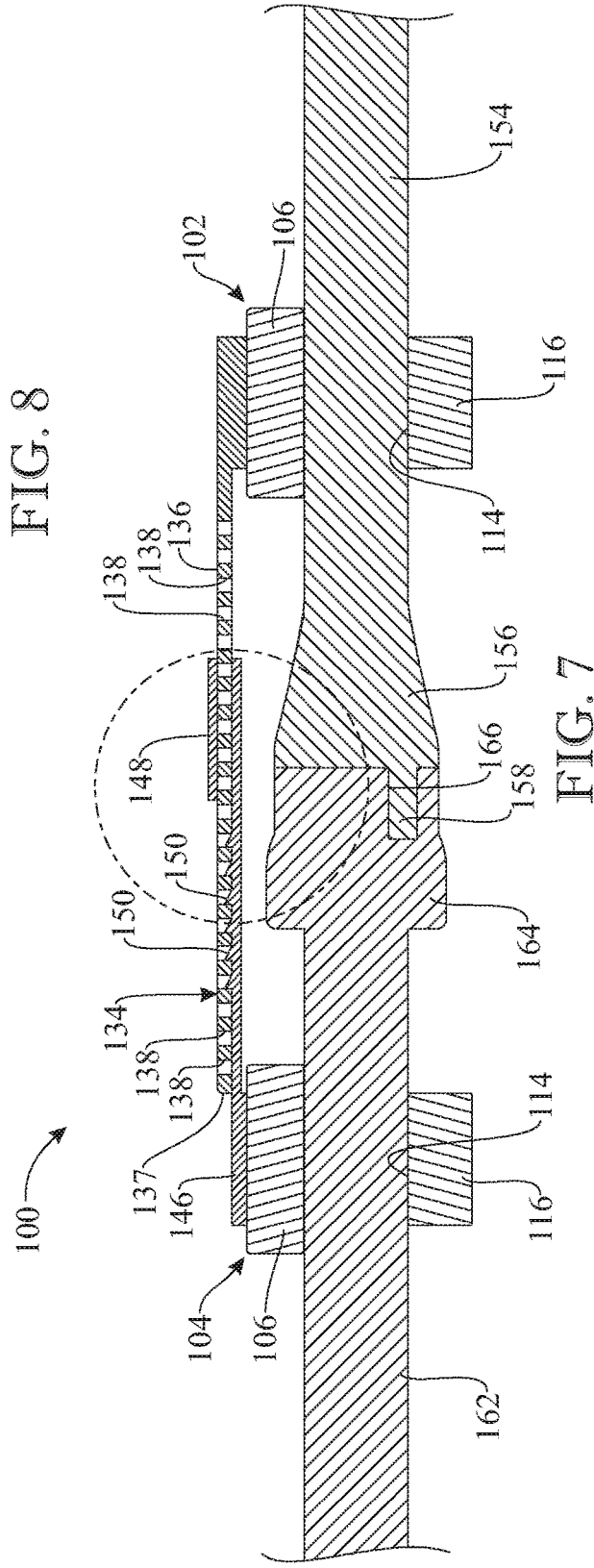
FIG. 7 presents a longitudinal sectional view of the electrical cord connector secured in place on the first electrical cord and the second electrical cord.

For example, in some embodiments, such as the present embodiment, multiple cavities may extend through the first elongated body 136 in spaced-part relationship to each other along at least a portion of the length of the first elongated body 136, and multiple protrusions may in like manner extend from the second elongated body 146 in spaced-apart relationship to each other. The protrusions and cavities may be configured to interconnect at varying relative longitudinal positions of the first elongated body 136 and second elongated body 146, allowing to adjust the separation between the first and second connector clamps 102 and 104. More specifically, as in the present embodiment, the multiple cavities may comprise multiple tab slots 138 extending through the first elongated body 136 in parallel, spaced-part relationship to each other along at least a portion of the length of the first elongated body 136. In turn, the multiple protrusions may comprise multiple tabs 150 extending from the second elongated body 146 in parallel, spaced-apart relationship to each other. As best shown in FIG. 3, the tabs 150 may have a triangular cross section configured to prevent the first elongated body 136 from sliding away from the second elongated body 146 (i.e. to prevent the first and second connector clamps 102 and 104 from separating), and to allow the first elongated body 136 to slide sliding further onto the second elongated body 146 (i.e. to allow the first and second connector clamps 202 and 204 to be brought closer together). Thus, the first elongated body 136 can be mounted onto the second elongated body 146 by inserting a distal end 137 of the first elongated body 136 through the retaining sleeve 148 and pulling the distal end 137 distally to bring the first connector clamp 102 closer to the second connector clamp 104. As illustrated in FIGS. 7 and 8, a selected length of the first elongated body 136 may be deployed in overlapping relationship to the second elongated body 146 and the tabs 150 inserted into the respective tab slots 138 to detachably secure the first elongated body 136 to the second elongated body 146 and adjust the length of the connecting member 134 and the distance between the first connector clamp 102 and the second connector clamp 104. Once the desired distance is achieved, a vertical side of the triangular tabs 150 prevents the first elongated body 136 from sliding out (i.e. proximally) relative to the second elongated body 146.

With reference to FIG. 2, in typical application, the electrical cord connector 100 may be deployed in place on the first electrical cord 154 and the second electrical cord 162 to secure the cord plug 156 on the first electrical cord 154 to the cord socket 164 on the second electrical cord 162. Accordingly, the plug prongs 158 on the cord plug 156 may be inserted in the respective prong slots 166 in the cord socket 164. In an illustrative application, the first electrical cord 154 may be electrically connected to an electrical appliance (not illustrated), whereas the second electrical cord 162 may be connected to an electrical outlet (not illustrated).

As illustrated in FIG. 2, the first connector clamp 102 may be fastened around the first electrical cord 154, and the second connector clamp 104 may be fastened around the second electrical cord 162. For this purpose, if the first and second connector clamps 102 and 104 are initially arranged in the closed clamp position, the flange teeth 124 on the clamp flange 122 of the second clamp portion 116 of each connector clamp 102, 104 may be disengaged from the companion flange teeth cavities 112 (FIG. 6) in the corresponding first clamp portion 106. This allows to then pivot the first and second clamp portions 106 and 116 on the hinge pin 128 and relative to one another, from the closed clamp position to the open clamp position. The first electrical cord 154 and the second electrical cord 162 may then be placed between the first and second clamp portions 106 and 116 of the first connector clamp 102 and second connector clamp 104, respectively. Next, the first and second clamp portions 106 and 116 may be pivoted relative to one another at the hinge pin 128 to the closed clamp position. This completes, or forms, the clamp interior 114 of the first clamp portion 106 and the clamp interior 114 of the second clamp portion 116, which respectively receive the first electrical cord 154 and second electrical cord 162. The flange teeth 124 on the clamp flange 122 of the second clamp portion 116 may be reengaged with the flange teeth cavities 112 in the first clamp portion 106 to secure the corresponding first connector clamp 102 and second connector clamp 104 in the closed clamp position (FIG. 6).

Figure 5:
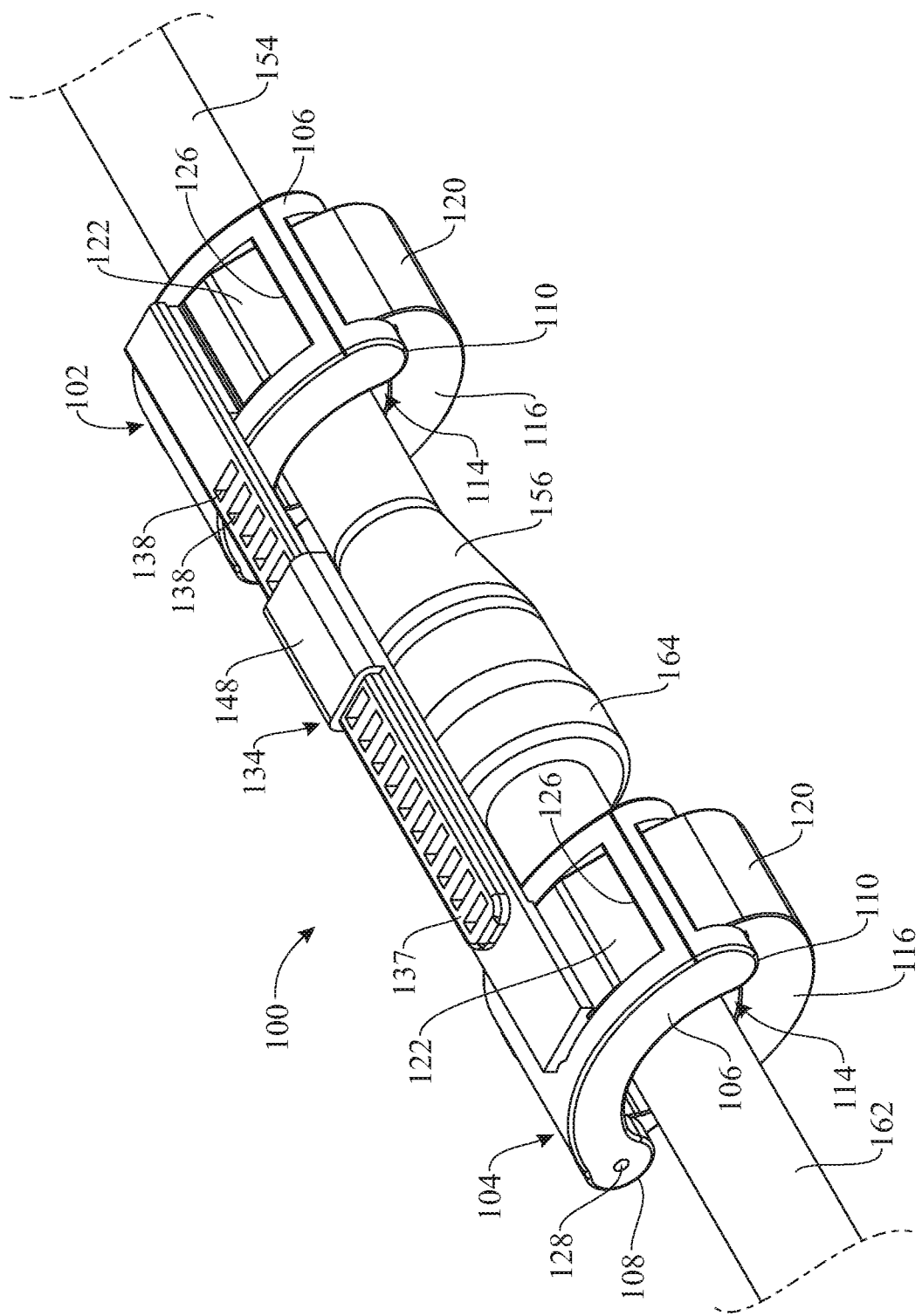
FIG. 5 presents a rear perspective view of the illustrative embodiment of the electrical cord connector of the present invention, with the first connector clamp on the first electrical cord and the second connector clamp on the second electrical cord, more particularly illustrating the connecting member in the secured configuration in typical application of the electrical cord connector.

Next, the connecting member 134 may be fastened and relatively tightened to secure the first and second connector clamps 102 and 104 in place. More specifically, as illustrated in FIGS. 3-5, the first elongated body 136 of the connecting member 134 may be inserted through the retaining sleeve 148 on the second elongated body 146 of the connecting member 134. As the first and second elongated bodies 136 and 146 are gradually overlapped, the first and second connector clamps 102 and 104 slide along the first and second electrical cords 154 and 162, respectively, towards the cord plug 156 and cord socket 164, respectively. Preferably, the first and second elongated bodies 136 and 146 are sufficiently overlapped to cause the first connector clamp 102 to engage the cord plug 156 on the first electrical cord 154 and the second connector clamp 104 to engage the cord socket 164 on the second electrical cord 162. The first elongated body 136 may then be attached to the overlapping second elongated body 146 typically by inserting the tabs 150 on the second elongated body 146 into the respective companion tab slots 138 in the first elongated body 136 to secure the connecting member 134 at the corresponding length, preferably with the first and second clamps 102 and 104 brought together to be placed at or adjacent to the cord plug 156 and cord socket 164, as mentioned. Thus, the length of the secured connecting member 134 is adjustable, and can be adjusted depending on the combined lengths of the cord plug 156 and the cord socket 164. Once secured and adjusted, the first and second connector clamps 102 and 104 respectively block movement of the cord plug 156 and cord socket 164 away from one another.

Therefore, the electrical cord connector 100 secures the second electrical cord 162 to the first electrical cord 154 and prevents the plug prongs 158 on the cord plug 156 from slipping out of the prong slots 166 in the cord socket 164 in the event that tension is applied to the first electrical cord 154 and the second electrical cord 162, such as may be the case if an attempt is made to move the appliance to which the first electrical cord 154 is connected outside the reach of the first electrical cord 154 and the second electrical cord 162. Thus, the electrical cord connector 100 may prevent the need of the user from having to reattach the cord plug 156 with the cord socket 164 one or multiple times during use of the appliance.

After use of the appliance is completed, the electrical cord connector 100 may be removed from the first electrical cord 154 and the second electrical cord 162 by pressing each clamp flange 122 through the corresponding opening 126 and disengaging each clamp flange 122 from the corresponding first clamp portion 106, pivoting the first connector clamp 102 and second connector clamp 104 to the open clamp position, and removing the first electrical cord 154 from the first connector clamp 102 and the second electrical cord 162 from the second connector clamp 104. The plug prongs 158 on the cord plug 156 may then be removed from the prong slots 166 in the cord socket 164.

Figure 11:
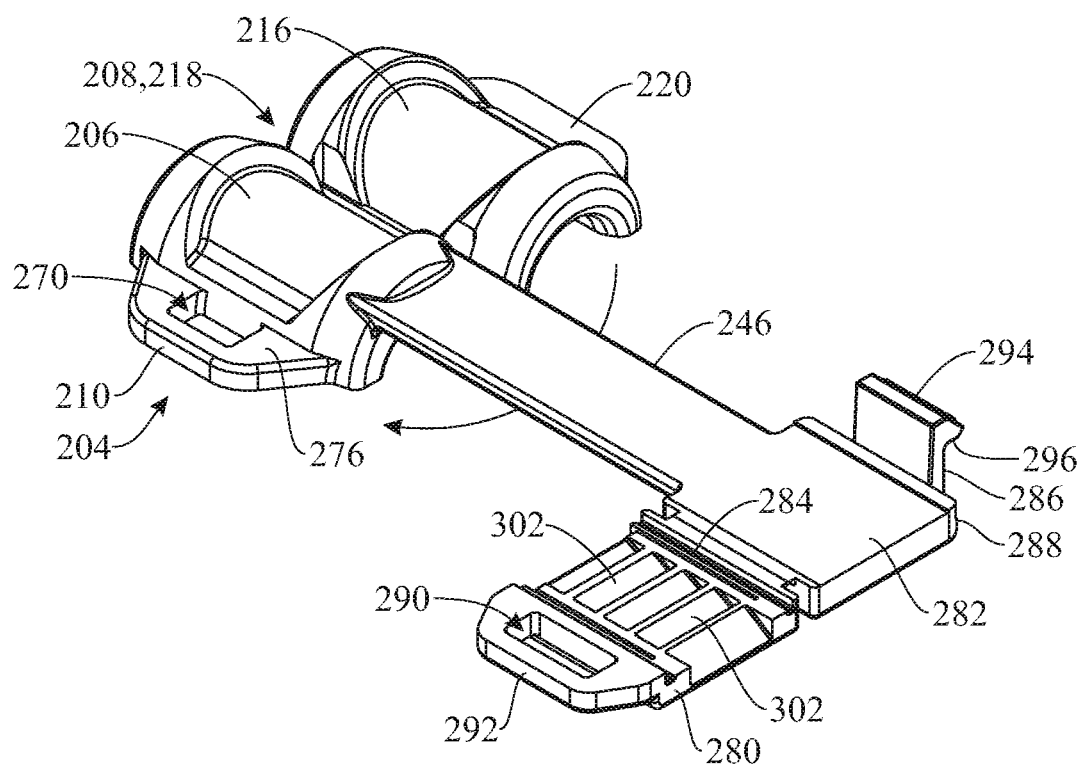
FIG. 11 presents a perspective view of a second connector clamp and a second elongated body comprised in the electrical cord connector in accordance with the second illustrative embodiment, the second connector clamp shown in an open clamp position.
Figure 12:
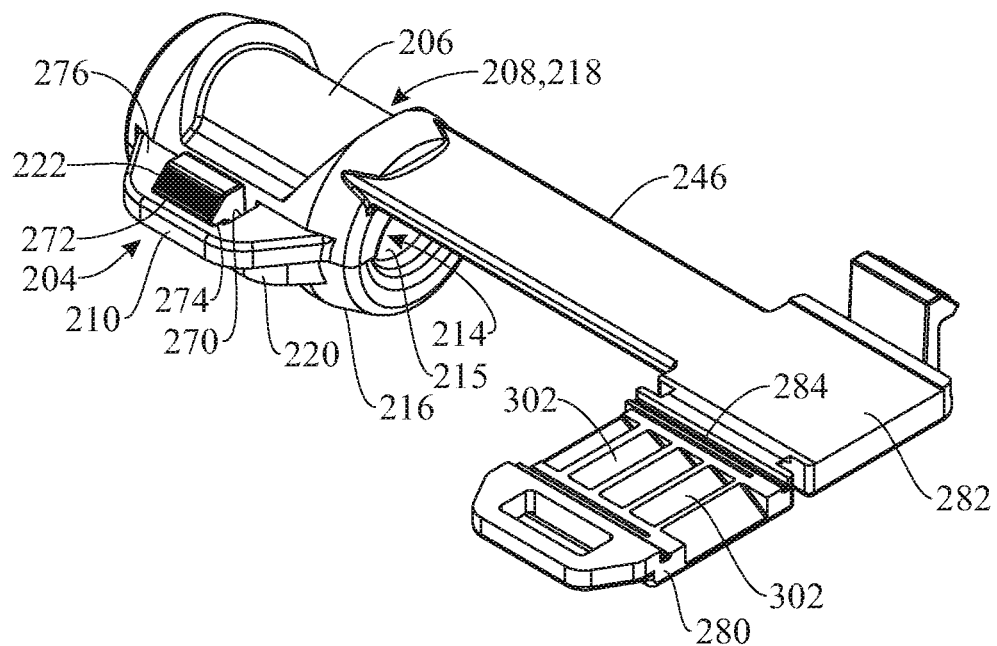
FIG. 12 presents a perspective view of the second connector clamp and second elongated body of FIG. 11, with the second connector clamp shown in a closed clamp position.
Figure 13:
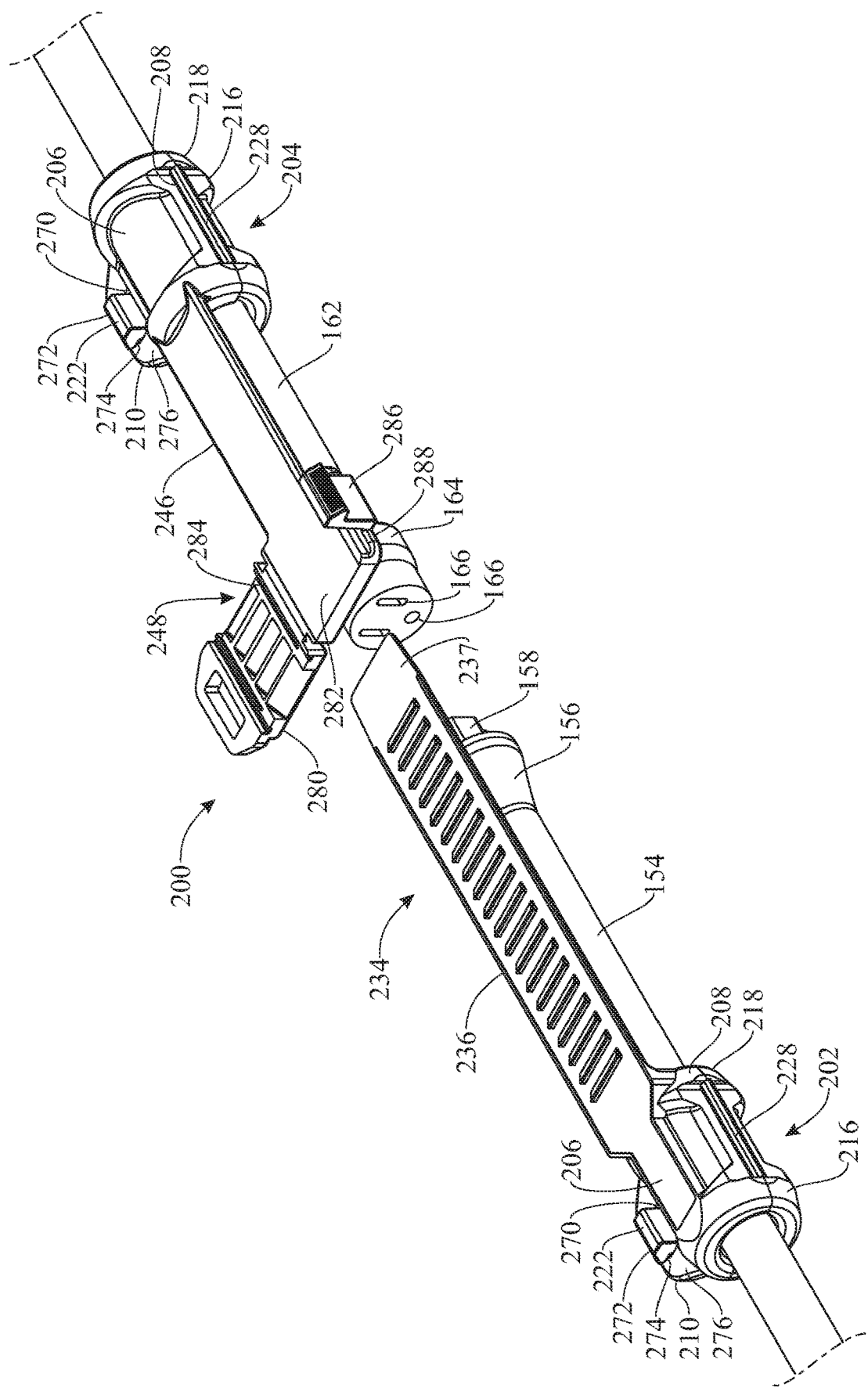
FIG. 13 presents a perspective view of the electrical cord connector in accordance with the second embodiment of the present invention, with the first and second connector clamps engaged with first and second electrical cords, respectively, and a retaining sleeve of the second elongate body shown in an open sleeve position.

The illustrations of FIGS. 9-15 show an electrical cord connector 200 in accordance with a second illustrative embodiment of the present invention. With reference initially to FIG. 13, the electrical cord connector 200 is suitably configured to secure an electrical connection between two electrical cords, such as, but not limited to, the aforementioned first and second electrical cords 154 and 162. Similarly to the previous embodiment, the electrical cord connector 200 comprises a first connector clamp 202, a second connector clamp 204, and a connecting member 234 connecting the first and second connector clamps 202 and 204 to one another.

Figure 9:
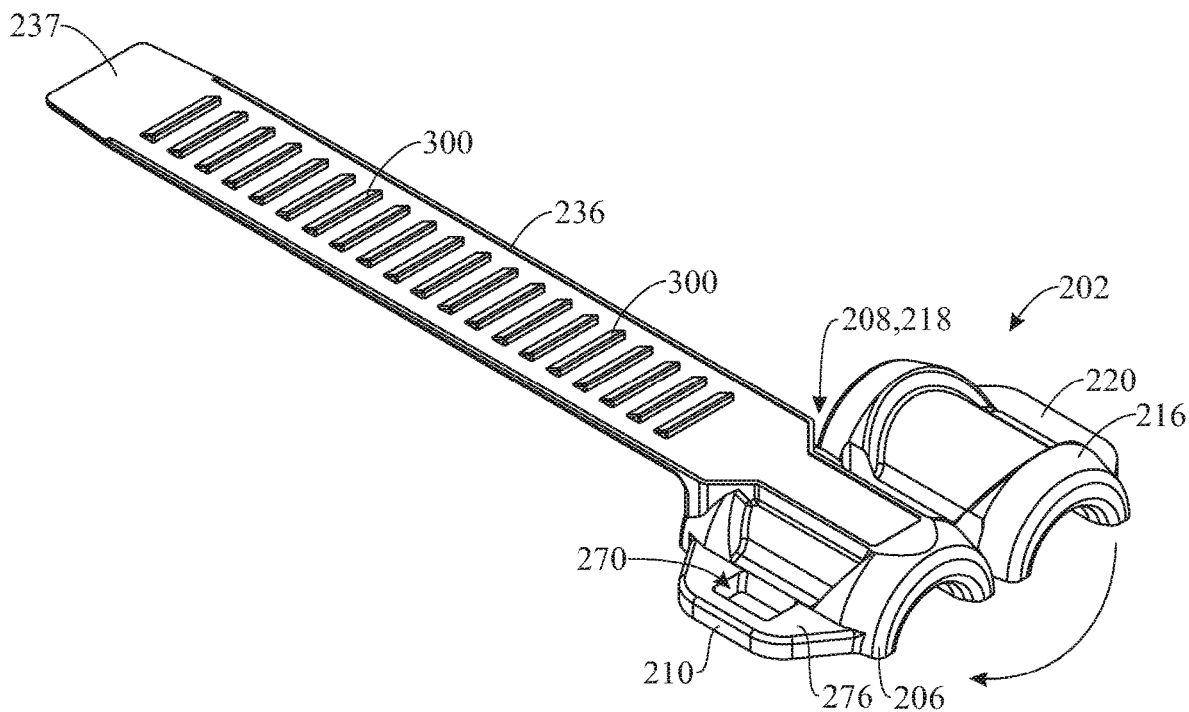
FIG. 9 presents a perspective view of a first connector clamp and a first elongated body comprised in an electrical cord connector in accordance with a second illustrative embodiment of the present invention, the first connector clamp shown in an open clamp position.
Figure 10:
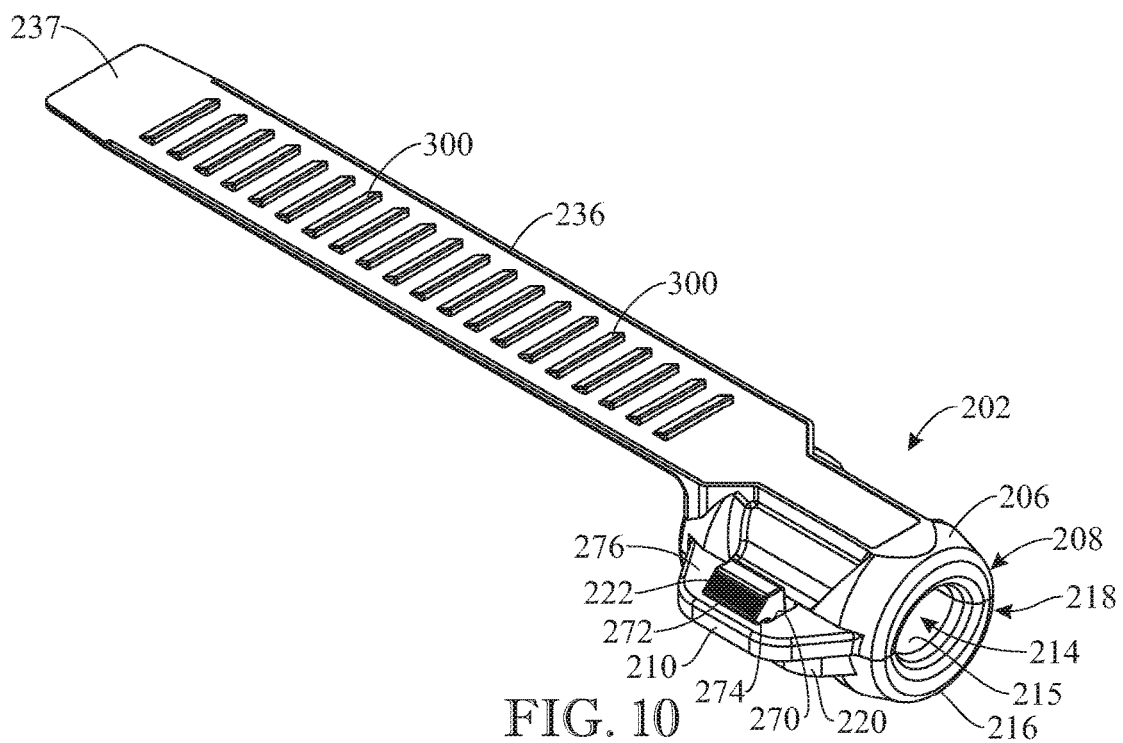
FIG. 10 presents a perspective view of the first connector clamp and first elongated body of FIG. 9, with the first connector clamp shown in a closed clamp position.

The illustrations of FIGS. 9 and 10 show the first connector clamp 202 in an open clamp position and a closed clamp position, respectively. Similarly, FIGS. 11 and 12 show the second connector clamp 204 in an open clamp position and a closed clamp position, respectively. Similarly to the first embodiment, the first connector clamp 202 and the second connector clamp 204 comprise a first clamp portion 206 and a second clamp portion 216 pivotably hinged to one another. Accordingly, each connector clamp 202, 204 is configurable between a closed clamp position (FIGS. 10, 12) and an open clamp position (FIGS. 9, 11). In the closed clamp position, the first clamp portion 206 and the second clamp portion 216 define a clamp interior 214 which is preferably less than the width or diameter of the cord plug 156 on the first electrical cord 154 and the cord socket 164 on the second electrical cord 162. In the present embodiment, the first and second connector clamps 202 and 204 are such that, when in the closed clamp position, the first and second connector clamps 202 and 204 are configured to fully encircle the first and second electrical cords 154 and 162, respectively, and the clamp interior 214 is defined by a generally cylindrical inner wall 215 similarly to the first and second electrical cords 154 and 162, to further stabilize the cords.

The first clamp portion 206 has a hinged end 208 and a free end 210. In turn, the second clamp portion 216 has a hinged end 218 and a free end 220. As best shown in FIG. 13, the hinged ends 208 and 218 of the first and second clamp portions 206 and 216 may be hinged to one another via a hinge 228. In some embodiments, the hinge 228 may be provided by a pin, similarly to the first embodiment. In other embodiments, such as the present embodiment, the hinge 228 may be integrally-formed into a single-piece unit with the first and second clamp portions 206 and 216, such as by plastic injection molding.

Similarly to the previous embodiment, a clamp flange 222 extends from the free end 220 of the second clamp portion 216. The clamp flange 222 of the present embodiment is shaped and sized to extend through a corresponding orifice 270 in the free end 210 of the first clamp portion 206. As shown in FIGS. 10, 12 and 13, the clamp flange 222 is elastically deformable and may have a T-shaped, L-shaped or other similar cross section such that the clamp flange 222 can extend through the orifice 270 and clip onto the free end 210, maintaining the first and second clamp portions 206 and 216 in the closed clamp position. In some embodiments, such as the present embodiment, the clamp flange 222 may have a sloped outer side 272 to facilitate insertion of the clamp flange 222 through the orifice 270, and an underside 274 parallel to a mating surface 276 of the free end 210 to enhance the clipping effect between the clamp flange 222 and the free end 210 in the closed clamp position.

Figure 14:
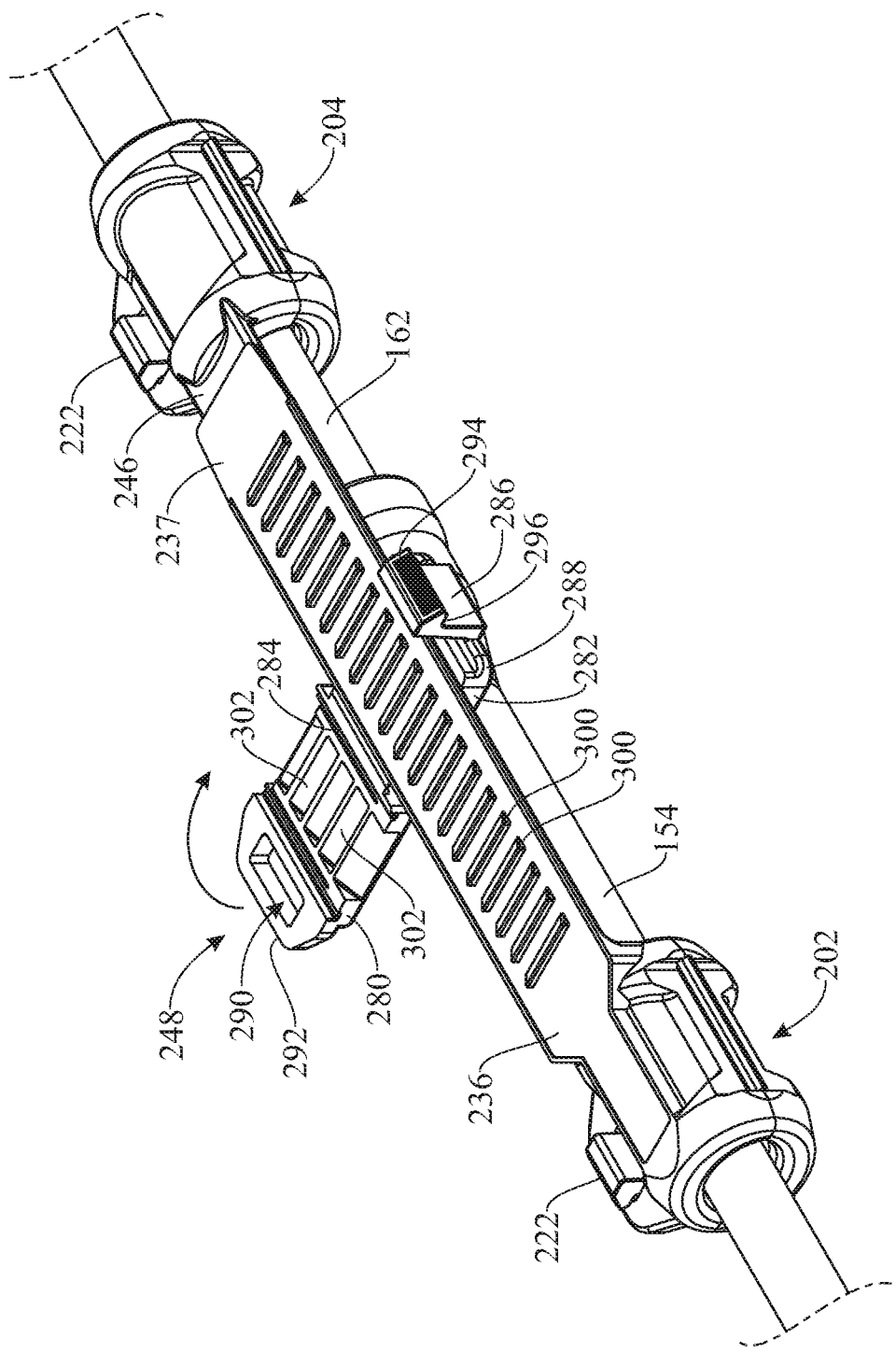
FIG. 14 presents a perspective view similar to FIG. 13, with the first and second connector clamps brought closer to one another along the first and second electrical cords to abut against a cord plug and cord socket of the first and second electrical cords, respectively.
Figure 15:
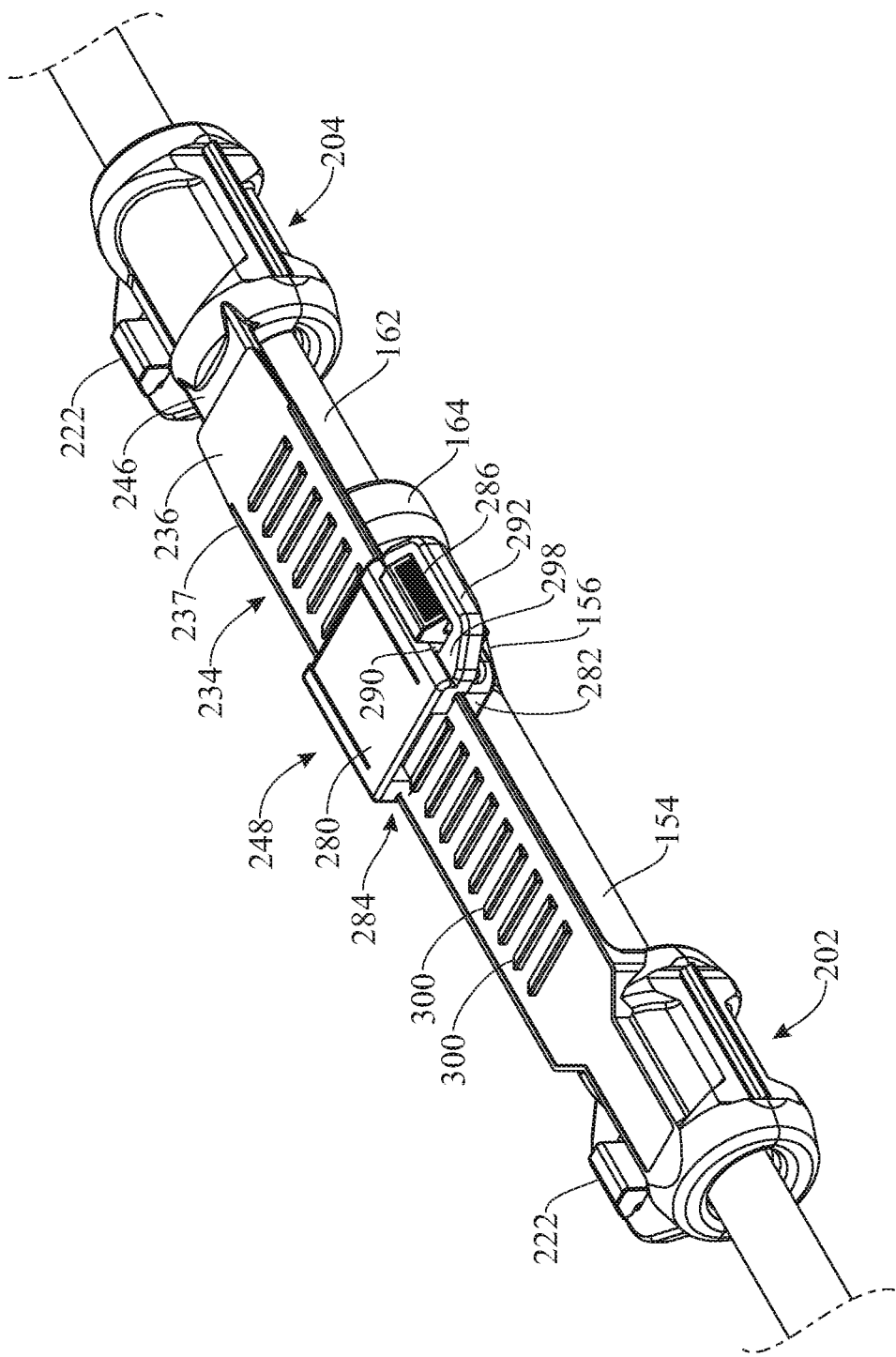
FIG. 15 presents a perspective view similar to FIG. 14, with the retaining sleeve moved to a closed sleeve position to prevent separation of the first and second connector clamps.

As illustrated in FIGS. 13-15, the connecting member 234 comprises first and second elongated bodies 236 and 246 extending from the first clamp portion 206 of the first and second connector clamp 202 and 204, respectively. The first and second elongated bodies 236 and 246 are configured to detachably and adjustably attach to one another. For instance, similarly to the previous embodiment, the second elongated body 246 includes a retaining sleeve 248 suitably sized and configured to receive and accommodate the first elongated body 236. Also similarly to the previous embodiment, the first and second elongated bodies 236 and 246 are strip-shaped.

The present embodiment is, however, different from the first embodiment in that the retaining sleeve 248 comprises a first sleeve portion 280 and a second sleeve portion 282 pivotably connected to one another at a hinge 284, which may be integrally or non-integrally formed with the first and second sleeve portions 280 and 282. Furthermore, the first and second sleeve portions 280 and 282 may be integrally-formed with one another, and may also be integrally formed with the second elongated body 246, as shown, and arranged at a front or free end of the second elongated body 246.

As shown in FIGS. 14 and 15, the first and second sleeve portions 280 and 282 are configured to selectively and pivotably adopt an open sleeve position (FIG. 14) and a closed sleeve position (FIG. 15). In the closed sleeve position of FIG. 15, the first and second sleeve portions 280 and 282 form a sleeve-shaped body through which the first elongated body 236 extends. In the open position of FIG. 14, the first and second sleeve portions 280 and 282 are pivotably separated from one another allowing to insert or remove the first elongated body 236 from the retaining sleeve 248. An elastic sleeve flange 286 may extend from a free end 288 of the second sleeve portion 282. The sleeve flange 286 is shaped and sized to extend through a corresponding orifice 290 in a free end 292 of the first sleeve portion 280. The sleeve flange 286 is elastically deformable and may have a T-shaped, L-shaped or other similar cross section such that the sleeve flange 286 can extend through the orifice 290 and clip onto the free end 292, maintaining the first and second sleeve portions 280 and 282 in the closed sleeve position. Similarly to the clamp flange 222, the sleeve flange 286 may have a sloped outer side 294 to facilitate insertion of the sleeve flange 286 through the orifice 290, and an underside 296 parallel to a mating surface 298 of the free end 292 to enhance the clipping effect between the sleeve flange 286 and the free end 292 in the closed sleeve position.

Similarly to the previous embodiment, the first and second elongated bodies 236 and 246 of the connecting member 234 may adjustably connect to one another by having one of said bodies 236 and 246 include multiple cavities and the other of said bodies 236 and 246 include multiple protrusions configured to engage with the multiple cavities at different longitudinal positions of the first and second elongated bodies 236 and 246 relative to one another. However, in the present embodiment, the cavities and mating protrusions are arranged differently to the first embodiment. Specifically, the first elongated body 236 includes multiple protrusions (e.g., multiple tabs 300) extending along the first elongated body 236 in spaced-part relationship to each other along at least a portion of the length of the first elongated body 236. In turn, the second elongated body 246 includes multiple cavities (e.g., multiple tab slots 302) configured to adjustably engage with the protrusions. In the present embodiment, the multiple cavities are comprised in the retaining sleeve 248, such as in the first sleeve portion 280 of the retaining sleeve 248. When the retaining sleeve 248 is arranged in the closed sleeve position (FIG. 15), one or more of the tabs 300 engage with one or more corresponding tab slots 302 to prevent a relative longitudinal movement between the first and second elongated bodies 236 and 246. Similarly to the previous embodiment, the protrusions (e.g., multiple tabs 300) have a triangular cross section configured to prevent the first elongated body 236 from sliding away from the second elongated body 246 (i.e. to prevent the first and second connector clamps 202 and 204 from separating), and to allow the first elongated body 236 from sliding further onto the second elongated body 246 (i.e. to allow the first and second connector clamps 202 and 204 to be brought closer together).

Similarly to the previous embodiment, in an example of use of the present embodiment, the electrical cord connector 200 may be deployed in place on the first electrical cord 154 and the second electrical cord 162 to secure the cord plug 156 on the first electrical cord 154 to the cord socket 164 on the second electrical cord 162 with the plug prongs 158 on the cord plug 156 safely inserted in the respective prong slots 166 in the cord socket 164. The first and second connector clamps 202 and 204 may then be clamped onto the first and second electrical cords 154 and 162, respectively, and secured in the closed clamp position by the respective clamp flanges 222. Next, as shown in FIG. 14, with the retaining sleeve 248 in the open sleeve position, the first elongated body 236 may be placed on the second sleeve portion 288 of the retaining sleeve 248, with a distal end 237 of the first elongated body 236 preferably protruding distally from the retaining sleeve 248. As shown in FIG. 15, the retaining sleeve 248 may be pivoted to the closed sleeve position, embracing the first elongated body 236. In some embodiments, such as the present embodiment, a user may then bring the first and second connector clamps 202 and 204 closer to one another such that the first and second connector clamps 202 and 204 respectively contact the cord plug 156 and cord socket 164; for example, the user may pull the distal end 237 of the first elongated body 236 towards the second connector clamp 204 to bring the first and second connector clamps 202 and 204 closer to one another. In other applications or embodiments (such as if the retaining sleeve 248 prevents bidirectional longitudinal movement of the first elongated body 236 relative to the second elongated body 246), the first and second connector clamps 202 and 204 may be placed against the cord plug 156 and cord socket 164, respectively, before pivoting the retaining sleeve 248 to the closed sleeve position. Finally, when needed, such as for storage purposes or to use the electrical cord connector 200 to secure a different set of cords, the electrical cord connector 200 may be easily disconnected from the first electrical cord 154 and the second electrical cord 162 by pressing on the sloped outer surface 272 of each clamp flange 222 to flex the clamp flange 222 inward and disengage the clamp flange 222 from the corresponding orifice 270 and allow to open the first and second connector clamps 202 and 204. In turn, the first elongated body 236 from the second elongated body 246 may optionally be disconnected from one another by pressing on the sloped outer surface 294 of the sleeve flange 286 to flex the sleeve flange 286 inward and disengage the sleeve flange 286 from the orifice 290 and allow to open the retaining sleeve 248.

Thus, the present invention provides an efficient and easy-to-use system and method for maintaining two electrical cords in perfect physical and electrical connection with one another. It should further be noted that, in the embodiments disclosed herein, the first and second clamp portions of the first connector clamp and the first and second clamp portions of the second connector clamp are the same (i.e. have the same shape and size) so that the first and second connector clamps can be interchangeably secured to the first and second electrical cords, i.e. with any of the two connector clamps being equally securable to any of the two electrical cords. Such an arrangement further facilitates usage of the electrical cord connector of the present disclosure.

Alternative embodiments are contemplated to the illustrative embodiment shown herein. For example, the shape and/or clamping mechanism of the first and second connector clamps and may vary. In another example, the length of the connecting member may vary. Alternative embodiments are also contemplated in which the number of cavities (e.g. tab slots) and protrusions (e.g. tabs) may vary. For example, the electrical cord connector may include one or more cavities and multiple longitudinally-spaced apart protrusions which may be selectively overlapped, and engaged, to adjust the length of the connecting member. Alternatively, the electrical cord connector may include one or more protrusions, and multiple longitudinally-spaced apart cavities, which may be selectively overlapped, and engaged, to adjust the length of the connecting member.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. An electrical cord connector configured to secure a first electrical cord in electrical connection with a second electrical cord, comprising:
   a first connector clamp;

a second connector clamp; and a length-adjustable connecting member configured to connect the second connector clamp to the first connector clamp in a spaced-apart relationship with one another, wherein the connecting member comprises a first elongated body on the first connector clamp and a second elongated body on the second connector clamp, wherein the first elongated body is configured to secure to the second elongated body at adjustable overlapping positions of the first and second elongated bodies relative to one another, wherein one of the first and second elongated bodies comprises a retaining sleeve configured to receive the other one of the first and second elongated bodies therethrough, wherein the retaining sleeve comprises a first sleeve portion and a second sleeve portion, wherein the first and second sleeve portions are pivotable relative to one another such that the retaining sleeve can selectively pivot between an open sleeve position and a closed sleeve position, wherein, in the open sleeve position, the retaining sleeve allows to insert and remove said other one of the first and second elongated bodies from the retaining sleeve, and wherein, in the closed sleeve position, the retaining sleeve embraces said other one of the first and second elongated bodies; wherein the first and second connector clamps can adopt a respective closed clamp position to respectively engage the first electrical cord and the second electrical cord, wherein the first connector clamp in the closed clamp position defines a clamp interior having a width less than a width of a cord plug on the first electrical cord, and the second connector clamp in the closed clamp position defines a clamp interior having a width less than a width of a cord socket on the second electrical cord; and further wherein the electrical cord connector is configured to adopt an assembled configuration in which the first and second connector clamps are arranged in the respective closed clamp positions and are arranged at a first distance from each other, with the first connector clamp engaging the first electrical cord and abutting against the cord plug and the second connector clamp engaging the second electrical cord and abutting against the cord socket, and further in which the connecting member prevents separation of the first connector clamp and the second connector clamp from one another.

2. The electrical cord connector of claim 1, wherein the electrical cord connector is further configured to adopt a partially assembled configuration, in which the first and second connector clamps are arranged in the respective closed clamp positions, with the first and second connector clamps engaging the first and second electrical cords, respectively, and with the first and second connector clamps arranged at a second distance from one another greater than the first distance, and further in which the connecting member prevents separation of the first connector clamp and the second connector clamp from one another and allows bringing the first and second connector clamps closer to one another.

3. The electrical cord connector of claim 1, wherein the first elongated body is integrally-formed into a single-piece unit with the first connector clamp, and the second elongated body is integrally-formed into a single-piece unit with the second connector clamp.

4. The electrical cord connector of claim 1, wherein the first and second elongated bodies are securable at adjustable overlapping positions by longitudinally adjusting engagement between at least one protrusion comprised in one of the first and second elongated bodies and a plurality of longitudinally-spaced-apart cavities comprised in the other one of the first and second elongated bodies.

5. The electrical cord connector of claim 1, wherein the first and second elongated bodies are securable at adjustable overlapping positions by longitudinally adjusting engagement between at least one cavity comprised in one of the first and second elongated bodies and a plurality of longitudinally-spaced-apart protrusions comprised in the other one of the first and second elongated bodies.

6. The electrical cord connector of claim 1, wherein one of the first and second elongated bodies comprises multiple longitudinally-spaced-apart cavities and the other one of the first and second elongated bodies comprises multiple longitudinally-spaced-apart protrusions, and further wherein the first and second elongated bodies are securable at different overlapping positions by adjusting which of the cavities and protrusions engage with each other.

7. The electrical cord connector of claim 1, wherein the first and second elongated bodies comprise a respective strip.

8. The electrical cord connector of claim 1, wherein the retaining sleeve of said one of the first and second elongated bodies comprises a plurality of longitudinally-spaced-apart cavities, and the other one of the first and second elongated bodies comprises multiple longitudinally-spaced-apart protrusions, and further wherein the first and second elongated bodies are securable at different overlapping positions by adjusting which of the cavities and protrusions engage with each other.

9. The electrical cord connector of claim 1, wherein the retaining sleeve of said one of the first and second elongated bodies comprises a plurality of longitudinally-spaced-apart protrusions, and the other one of the first and second elongated bodies comprises multiple longitudinally-spaced-apart cavities, and further wherein the first and second elongated bodies are securable at different overlapping positions by adjusting which of the cavities and protrusions engage with each other.

10. The electrical cord connector of claim 1, wherein the first connector clamp is shaped and sized the same as the second connector clamp.

11. The electrical cord connector of claim 1, wherein the retaining sleeve comprises a clip fastener configured to secure the retaining sleeve in the closed sleeve position.

12. The electrical cord connector of claim 11, wherein the clip fastener is configured to releasably secure the retaining sleeve in the closed sleeve position.

13. The electrical cord connector of claim 1, wherein at least one of the first and second connector clamps is securable in the closed clamp position by a clip fastener.

14. The electrical cord connector of claim 13, wherein the clip fastener is configured to releasably secure said at least one of the first and second connector clamps in the closed sleeve position.

15. An electrical cord connector configured to secure a first electrical cord in electrical connection with a second electrical cord, comprising:

a first connector clamp;
a second connector clamp; and
a length-adjustable connecting member configured to connect the second connector clamp to the first connector clamp in a spaced-apart relationship with one another, wherein the connecting member comprises a first elongated body on the first connector clamp and a second elongated body on the second connector clamp, wherein the first elongated body is configured to secure to the second elongated body at adjustable overlapping positions of the first and second elongated bodies relative to one another, wherein one of the first and second elongated bodies comprises a retaining sleeve configured to receive the other one of the first and second elongated bodies therethrough, wherein the retaining sleeve of said one of the first and second elongated bodies comprises a plurality of longitudinally-spaced-apart cavities, and the other one of the first and second elongated bodies comprises multiple longitudinally-spaced-apart protrusions, and further wherein the first and second elongated bodies are securable at different overlapping positions by adjusting which of the cavities and protrusions engage with each other; wherein the first and second connector clamps can adopt a respective closed clamp position to respectively engage the first electrical cord and the second electrical cord, wherein the first connector clamp in the closed clamp position defines a clamp interior having a width less than a width of a cord plug on the first electrical cord, and the second connector clamp in the closed clamp position defines a clamp interior having a width less than a width of a cord socket on the second electrical cord; and further wherein the electrical cord connector is configured to adopt an assembled configuration in which the first and second connector clamps are arranged in the respective closed clamp positions and are arranged at a first distance from each other, with the first connector clamp engaging the first electrical cord and abutting against the cord plug and the second connector clamp engaging the second electrical cord and abutting against the cord socket, and further in which the connecting member prevents separation of the first connector clamp and the second connector clamp from one another.

16. The electrical cord connector of claim 15, wherein the electrical cord connector is further configured to adopt a partially assembled configuration, in which the first and second connector clamps are arranged in the respective closed clamp positions, with the first and second connector clamps engaging the first and second electrical cords, respectively, and with the first and second connector clamps arranged at a second distance from one another greater than the first distance, and further in which the connecting member prevents separation of the first connector clamp and the second connector clamp from one another and allows bringing the first and second connector clamps closer to one another.

17. The electrical cord connector of claim 15, wherein the first elongated body is integrally-formed into a single-piece unit with the first connector clamp, and the second elongated body is integrally-formed into a single-piece unit with the second connector clamp.

18. An electrical cord connector configured to secure a first electrical cord in electrical connection with a second electrical cord, comprising:
  a first connector clamp;
  a second connector clamp; and
  a length-adjustable connecting member configured to connect the second connector clamp to the first connector clamp in a spaced-apart relationship with one another, wherein the connecting member comprises a first elongated body on the first connector clamp and a second elongated body on the second connector clamp, wherein the first elongated body is configured to secure to the second elongated body at adjustable overlapping positions of the first and second elongated bodies relative to one another, wherein one of the first and second elongated bodies comprises a retaining sleeve configured to receive the other one of the first and second elongated bodies therethrough, wherein the retaining sleeve of said one of the first and second elongated bodies comprises a plurality of longitudinally-spaced-apart protrusions, and the other one of the first and second elongated bodies comprises multiple longitudinally-spaced-apart cavities, and further wherein the first and second elongated bodies are securable at different overlapping positions by adjusting which of the cavities and protrusions engage with each other; wherein the first and second connector clamps can adopt a respective closed clamp position to respectively engage the first electrical cord and the second electrical cord, wherein the first connector clamp in the closed clamp position defines a clamp interior having a width less than a width of a cord plug on the first electrical cord, and the second connector clamp in the closed clamp position defines a clamp interior having a width less than a width of a cord socket on the second electrical cord; and further wherein the electrical cord connector is configured to adopt an assembled configuration in which the first and second connector clamps are arranged in the respective closed clamp positions and are arranged at a first distance from each other, with the first connector clamp engaging the first electrical cord and abutting against the cord plug and the second connector clamp engaging the second electrical cord and abutting against the cord socket, and further in which the connecting member prevents separation of the first connector clamp and the second connector clamp from one another.

19. The electrical cord connector of claim 18, wherein the electrical cord connector is further configured to adopt a partially assembled configuration, in which the first and second connector clamps are arranged in the respective closed clamp positions, with the first and second connector clamps engaging the first and second electrical cords, respectively, and with the first and second connector clamps arranged at a second distance from one another greater than the first distance, and further in which the connecting member prevents separation of the first connector clamp and the second connector clamp from one another and allows bringing the first and second connector clamps closer to one another.

20. The electrical cord connector of claim 18, wherein the first elongated body is integrally-formed into a single-piece unit with the first connector clamp, and the second elongated body is integrally-formed into a single-piece unit with the second connector clamp.

* * * * *